United States Patent

Kumar et al.

Patent Number: 6,028,402
Date of Patent: Feb. 22, 2000

[54] AUTOMATIC RAIL CHARACTERIZATION FOR ADHESION SYSTEM EVALUATION FOR AC LOCOMOTIVES

[75] Inventors: Ajith Kuttannair Kumar; Admir Mesalic, both of Erie; Bret Dwayne Worden, Union City, all of Pa.

[73] Assignee: General Electric Company, Erie, Pa.

[21] Appl. No.: 09/236,213

[22] Filed: Jan. 25, 1999

[51] Int. Cl.⁷ .............................. G05F 15/20; B60K 1/00; B61C 15/08
[52] U.S. Cl. ........................... 318/52; 318/430; 318/362; 318/71; 180/197; 180/65.1
[58] Field of Search ................................ 318/49–71, 430, 318/360–376, 807, 799, 801; 180/197, 65.1, 65.2, 65.8, 65.4; 303/151, 20, 122.01, 100, 111, 112; 192/832, 76, 103 F; 291/2

[56] References Cited

U.S. PATENT DOCUMENTS

| | | | |
|---|---|---|---|
| 4,315,203 | 2/1982 | Ibamoto et al. | 318/807 |
| 4,463,289 | 7/1984 | Young | 318/52 |
| 4,701,682 | 10/1987 | Hirotsu et al. | 318/52 |
| 4,896,090 | 1/1990 | Balch et al. | 318/52 |
| 4,936,610 | 6/1990 | Kumar et al. | 291/2 |
| 4,944,539 | 7/1990 | Kumar et al. | |
| 5,353,225 | 10/1994 | Tsuyama et al. | |
| 5,424,948 | 6/1995 | Jordan, Jr. | |
| 5,480,220 | 1/1996 | Kumar | 303/151 |
| 5,661,378 | 8/1997 | Hapeman | 318/52 |
| 5,841,254 | 11/1998 | Balch et al. | 318/430 |
| 5,848,671 | 12/1998 | Kattainen | 187/291 |

*Primary Examiner*—Paul Ip
*Attorney, Agent, or Firm*—Jill M. Breedlove; Douglas E. Stoner

[57] ABSTRACT

A system and method for evaluating the effectiveness of a tractive effort maximizing control system in a wheeled vehicle utilizes a process of operating the vehicle by applying controlled power to at least some wheels of the vehicle to enable motion of the vehicle, disabling the tractive effort maximizing control system, and varying creep speed between a minimum value and a selected maximum value while monitoring the tractive effort to identify a maximum available tractive effort. Thereafter, the tractive effort maximizing control system is enabled and the resulting tractive effort developed by the vehicle measured. Comparing the resulting tractive effort to the maximum available tractive effort produces a measure of effectiveness of the tractive effort maximizing control system.

7 Claims, 4 Drawing Sheets

CREEP SPEED SET POINT CONTROL (ARC)

A: CONTROLLED CREEP (CREEP SWEEP)
B: NORMAL OPERATION (CONTROL SYSTEM UNDER TEST)
CREEP SPEED SET POINT CONTROL

AUTOMATIC RAIL CHARACTERIZATION FOR ADHESION SYSTEM EVALUATION FOR AC LOCOMOTIVES

BACKGROUND OF THE INVENTION

The present invention relates generally to traction control systems for vehicles and, more particularly, to a method for evaluating the effectiveness of a tractive effort control system in a vehicle such as an ac electric motor propelled locomotive.

In a modern conventional diesel-electric locomotive, a thermal prime mover (typically a 16-cylinder turbocharged diesel engine) is used to drive an electrical transmission comprising a synchronous generator that supplies electric current to a plurality of electric traction motors whose rotors are coupled through speed-reducing gearing to the respective axle-wheel sets of the locomotive. The generator typically comprises a main 3-phase traction alternator, the rotor of which is mechanically coupled to the output shaft of the engine. When excitation current is supplied to field windings on the rotating rotor, alternating voltages are generated in the 3-phase armature windings on the stator of the alternator. These voltages are rectified and applied via a DC link to one or more inverters where the DC voltage is inverted to AC and applied to AC traction motors.

In normal motoring operation, the propulsion system of a diesel-electric locomotive is so controlled as to establish a balanced steady-state condition wherein the engine-driven alternator produces, for each discrete position of a throttle handle, a substantially constant, optimum amount of electrical power for the traction motors. In practice, suitable means are provided for overriding normal operation of the propulsion controls and reducing engine load in response to certain abnormal conditions, such as loss of wheel adhesion or a load exceeding the power capability of the engine at whatever engine speed the throttle is commanding.

One factor affecting traction performance is the creep level of the locomotive's traction control subsystem. Accordingly, in order to maximize traction performance, it is desirable to separately control the allowable creep level of each individual axle.

Another factor affecting traction performance is the level of torsional resonant vibration in the mechanical drive train, which comprises a locomotive axle and its associated two wheels, the motor to axle gearbox, the induction motor, and the induction motor drive. In particular, during operation in certain regions of the adhesion characteristic curve, the mechanical drive train may experience a net negative damping which produces severe vibration levels at the system's natural frequencies. As is well-known, an adhesion characteristic curve graphically represents coefficient of friction versus percentage creep. At 0% creep, maximum damping on the mechanical system is represented. As the creep level increases in the portion of the characteristic curve to the left of its peak, the damping effect on the mechanical system decreases to a value of zero at the peak. For values of creep to the right of the peak, the damping provided to the mechanical system becomes a larger negative number.

U.S. Pat. No. 5,841,254 discloses one form of tractive effort maximizing and vibration control system for ac electric motor propelled locomotives. In general, such a traction control system for an ac locomotive optimizes traction performance by separately controlling the allowable creep level of each individual axle and by minimizing torsional vibration per axle. The traction control system comprises a torque maximizer and a torsional vibration detector. The torque maximizer measures traction system performance levels and determines the desired torque maximizer state for maximizing traction performance of each individual axle. The torsional vibration detector digitally processes estimated torque feedback of each traction motor in order to detect an unacceptable level of torsional vibration. The outputs of the torque maximizer and the torsional vibration detector are provided to a creep modulator which processes these inputs in order to control the operating creep level of each locomotive axle. As a result, traction performance is improved while minimizing torsional vibration and operating noise levels due to wheel/rail squeal. Note also that the control system may be used in other ac induction motor propelled vehicles such as, for example, off-highway, earth-moving vehicles and transit cars.

The development of traction control systems is a continuous process with various forms of control systems being developed. One problem with the developed systems is determining whether such new systems function as well as or better than other systems. In a typical test environment, the general practice is to operate the vehicle on a test track using a standard system, remove the standard system, install the new system and repeat the operation. During each operation, the level of tractive effort produced is measured. What such a process fails to accommodate are changing track conditions between tests of the standard and new system. For example, in ideal weather, wheel adhesion on a rail track will improve as the track is used. However, any variation in weather can affect track conditions. Such variations can include snow or rain. Further, if tests are run days apart, corrosion on the track will affect adhesion. Such changes in track adhesion characteristics can easily bias measurements of control system effectiveness. Accordingly, it would be desirable to minimize the effects of changing track conditions during control system evaluation.

SUMMARY OF THE INVENTION

Evaluation of the effectiveness of a tractive effort maximizing control system is attained in a multi-axle traction vehicle in one form by operating one of the axles of the traction vehicle with the control system to be evaluated and operating another of the axles of the traction vehicle with a continuously varying creep speed. In another form, the invention is implemented by cyclically enabling the tractive effort maximizing control system on one axle and thereafter disabling it while continuously varying the creep speed so as to establish the maximum available tractive effort that can be produced by that axle and comparing the maximum available tractive effort against that level generated by the control system. This method overcomes the prior art limitations by operating at many points throughout the range of creepage and applying the maximum traction that the rail will bear at each creepage level. This allows the user to determine the shape of the friction creep curve for the locomotive and its control system and the associated rail in a single test run. Testing with the system on one axle allows comparison to another axle running a torque optimizing routine with some adjustment for weight transfer and rail cleaning effect. For example, on a six-axle locomotive, axles 1, 3 and 5 can be operated in a manner to determine the maximum available tractive effort while simultaneously running torque optimizing software on axles 2, 4 and 6. This allows immediate real time comparison of the result of the torque optimizing software against the ideal or maximum available tractive effort. If the axles 1, 3 and 5 indicate that 34 to 36 percent adhesion is available, then any production of adhesion less than that percentage by axles 2, 4 and 6 would indicate that the axles are not operating optimally. Further, the method can be used to determine whether a particular axle is operating on the positively sloped portion of the friction creep curve or the negatively sloped portion or at the peak of that curve. While the disabling function of the present method for determining the maximum available traction is not used in normal service since the method would force the creepage level to values that an optimizing algorithm would not otherwise choose, the method is preferably implemented in a software program that is resident in the production software and engageable when the system detects that train stall is eminent. This allows characterization of the friction creep curve in the stalled condition. Such information can be useful for quantifying risks associated with a given dispatch adhesion level. Furthermore, the method permits the definition of extreme conditions which can then lead to future improvements to deal with those particular conditions and to more intelligently dispatch based on probability of stalling. This information could also be used for comparing how effective the control system estimated the desired creep levels for further enhancement and modification of the control system.

In the second embodiment of the invention, the creep set point is varied uniformly from a minimum value to a maximum value and the achieved tractive effort or adhesion is observed. When the maximum tractive effort is determined, the control system which is being evaluated can be turned on for a period of time. The process is then repeated cyclically whereby the control system is evaluated when it is initialized at either end of the creep curve. The achieved adhesion during the actual control system enforcement of creep can be compared to the potential maximum that could have been achieved to give a measure of the effectiveness of the control algorithms and implementations under various rail conditions. In the illustrated example, the test software runs continuously. If the time between the normal and forced creep operations are small, the tests can be repeated many times during a single run of a test track to determine quickly and with statistical confidence the effectiveness of the tractive effort maximizing system.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
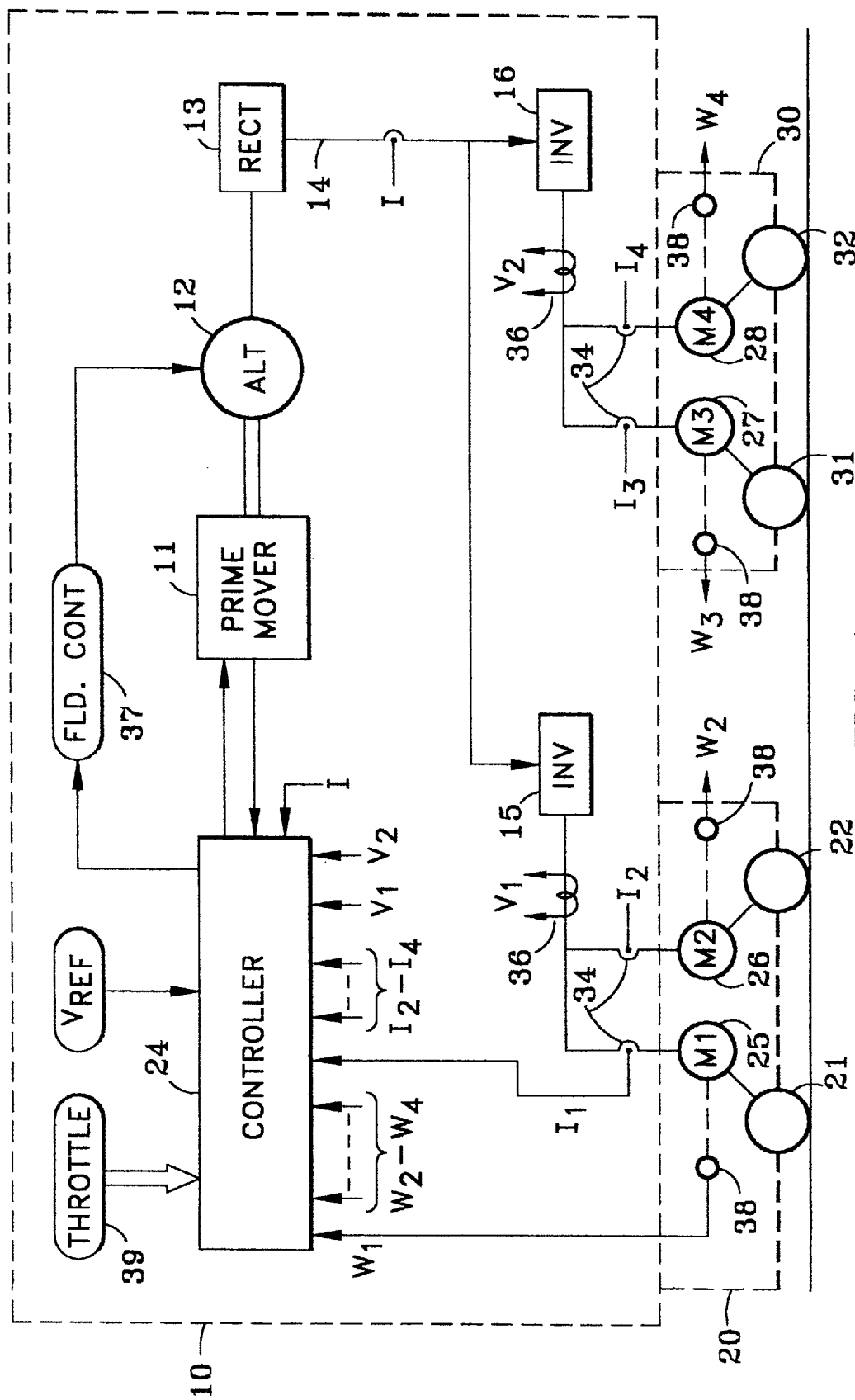
FIG. 1 is a simplified block diagram of the principal components of a propulsion system for a diesel electric locomotive with which the present invention may be used.

The present invention may be utilized in various types of electric motor powered vehicles, such as, for example, off-highway vehicles (earth moving machines), transit cars, and locomotives. For purposes of illustration, the invention is described herein as it may be applied to a locomotive. A propulsion system 10 of FIG. 1 includes a variable speed primer mover 11 mechanically coupled to a rotor of a dynamo electric machine 12 comprising a 3-phase alternating current (AC), synchronous generator or alternator. The 3-phase voltages developed by alternator 12 are applied to AC input terminals of a conventional power rectifier bridge 13. The direct current (DC) output of bridge 13 is coupled via a DC link 14 to a number of controlled inverters 15 and 16 which invert the DC power to AC power at a selectable variable frequency. The inverters 15 and 16 are conventional inverters employing high power gate turn-off devices (GTO's) which switch in and out of conduction in response to gating signals from a system controller 24 so as to invert the DC voltage on DC link 14 to controlled frequency AC voltage. The AC power is electrically coupled in energizing relationship to each of a plurality of adjustable speed AC traction motors 25–28. Prime mover 11, alternator 12, rectifier bridge 13, and inverters 15 and 16 are mounted on a platform of the traction vehicle 10, illustrated as a 4-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors 25–28 is hung on a separate axle and its rotor is mechanically coupled, via conventional gearing, in driving relationship to the associated axle-wheel set. In the illustrative embodiment, the two motors 25 and 26 are electrically coupled in parallel with one another and receive power from inverter 15 while motors 27 and 28 are coupled to inverter 16. However, in some instances, it may be desirable to provide an inverter for each motor or to couple additional motors to a single inverter. The invention is not limited to such 4-axle systems and is equally applicable to 6-axle locomotives with six inverters each connected for powering a respective one of six traction motors each connected to respective ones of the six axles. Suitable current transducers 34 and voltage transducers 36 are used to provide a family of current and voltage feedback signals which are respectively representative of the magnitudes of current and voltage in the motor stators. Speed sensors 38 are used to provide speed signals representative of the rotational speeds W1–W4 in revolutions per minute (RPM) of the motor shafts. These speed signals are readily converted to wheel speed in a well-known manner. For simplicity, only single lines have been indicated for power flow although it will be apparent that motors 25–28 are typically three phase motors so that each power line represents three lines in such applications.

The magnitude of output voltage and current applied to rectifier bridge 13 is determined by the magnitude of excitation current supplied to the field windings of alternator 12 by field controller 37 which may be a conventional phase controlled rectifier circuit since the alternator field requires DC excitation. The excitation current is set in response to an operator demand (throttle 39) for vehicle speed by controller 24 which is in turn responsive to actual speed as represented by signals W1–W4. Controller 24 converts the throttle command to a corresponding torque request for use in controlling motors 25–28. Since AC motor torque is proportional to rotor current and air gap flux, these quantities may be monitored; or, more commonly, other quantities, such as applied voltage, stator current and motor RPM, may be used to reconstruct motor torque in controller 24. See, for example, U.S. Pat. No. 4,243,927.

In an electrical braking or retarding mode of operation, inertia of the moving vehicle is converted into electrical energy by utilizing the traction motors as generators. Motor voltage and current are controlled to set a desired braking effort.

Figure 2:
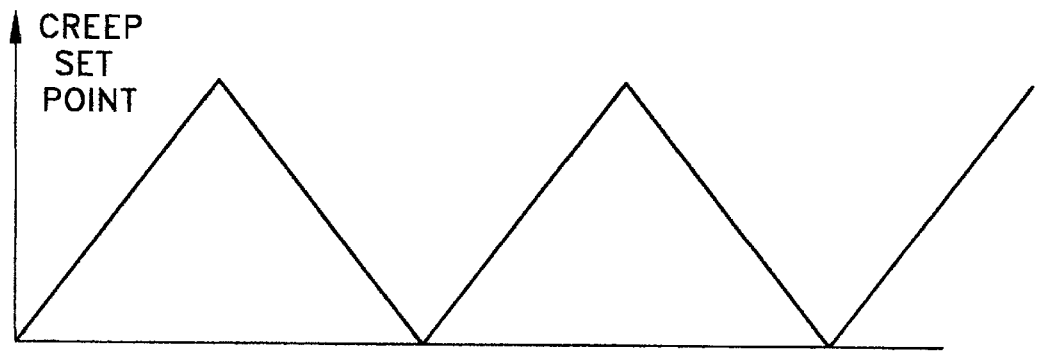
FIG. 2 is a graph of forced creep set point variation as a function of time.
Figure 3:
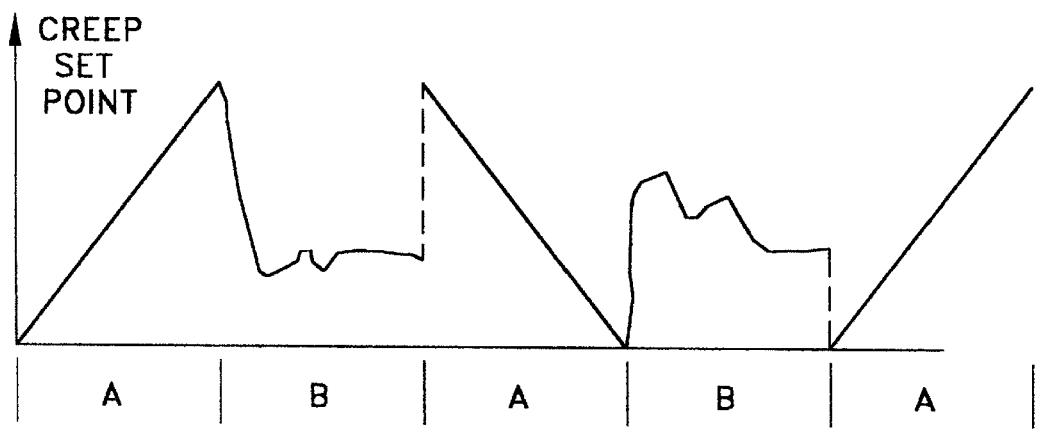
FIG. 3 is a graph of variable creep set point interspersed with creep set point regulation.

FIG. 2 illustrates a creep set point control function using the present invention to adjust creep set point from some minimum value, e.g., zero wheel slip, up to some maximum value, such as for example, sixteen percent wheel slip. The curve of FIG. 2 illustrates a typical operation in a system in which multiple axles are powered and at least one axle is cycled in accordance with the set curve while another axle is controlled by the tractive effort optimizing software and the results compared to the maximum available tractive effort determined by the software that continuously varies the creep set point. FIG. 3 illustrates the situation in which a single powered axle is sequentially cycled between a variable creep set point control and operation under the tractive effort optimizing system. Note that the creep set point at which the tractive effort optimizing software is energized varies from cycle to cycle so that it may be enabled at a maximum creep in one cycle and at minimum creep in a next succeeding cycle.

Figure 4:
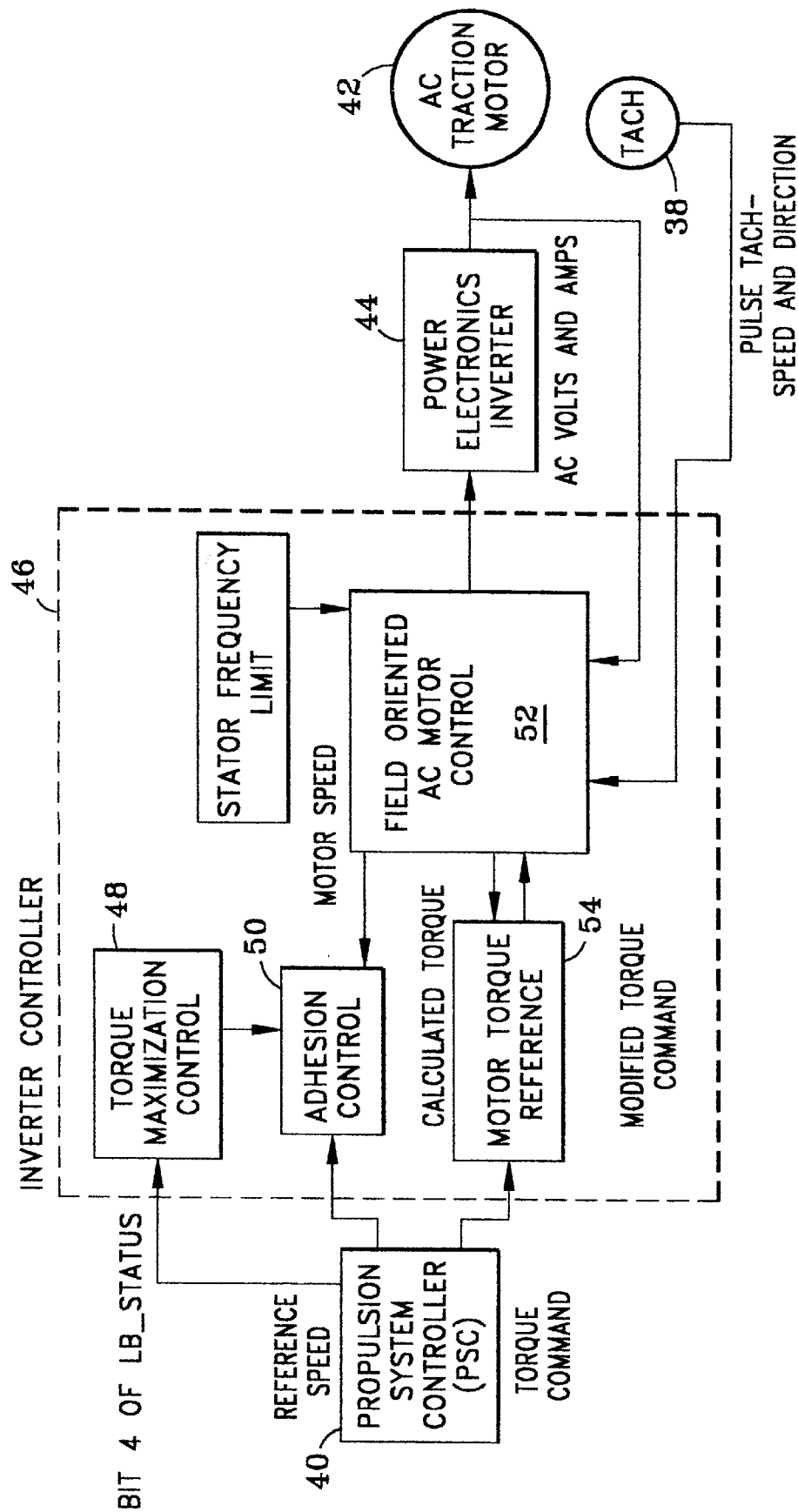
FIG. 4 is a simplified block diagram of the functional interfaces between the system controller and the motor drive in a system in which the present invention can be used.

Turning now to FIG. 4, there is shown a simplified overall block diagram of the primary functional interfaces between a propulsion system controller (PSC) 40, an AC traction motor 42, a power electronics inverter 44 and the inverter controller or wheel slip/wheel slide control system 46. The control system 46 may also be referred to as the adhesion control system. All of the control functions indicated by the blocks 40, 46 are implemented in the controller 24 of FIG. 1. The power electronics inverter 44 may be equivalent to either of the inverters 15 or 16 of FIG. 1 and the AC traction motor 42 may be one of the traction motors 21, 22, 31, or 32. Tachometer 38 provides the speed and direction feedback signals to the control system.

The inverter controller 46 includes a torque maximization control 48 which provides the creep set point to adhesion control 50. Adhesion control 50 is also provided with a reference speed (ground speed) signal from the PSC 40. The signals from the adhesion control 50 are supplied to a field oriented AC motor control which supplies the signals to control the power electronics inverter 44. Block 54 is a motor torque reference block receiving signals from the PSC 40 and supplying a modified torque command to the motor control 52. It will be noted that the torque control 48 also receives a status signal from PSC 40 which determines whether or not the maximization control is to be operated. If the status signal is in one state, the control 48 is disabled and if the status signal is another state, the control 48 is enabled. A more complete description of the operation of the torque maximization control in regulating the operation of the motor control 52 can be had by reference to U.S. Pat. No. 5,841,254.

Figure 5:
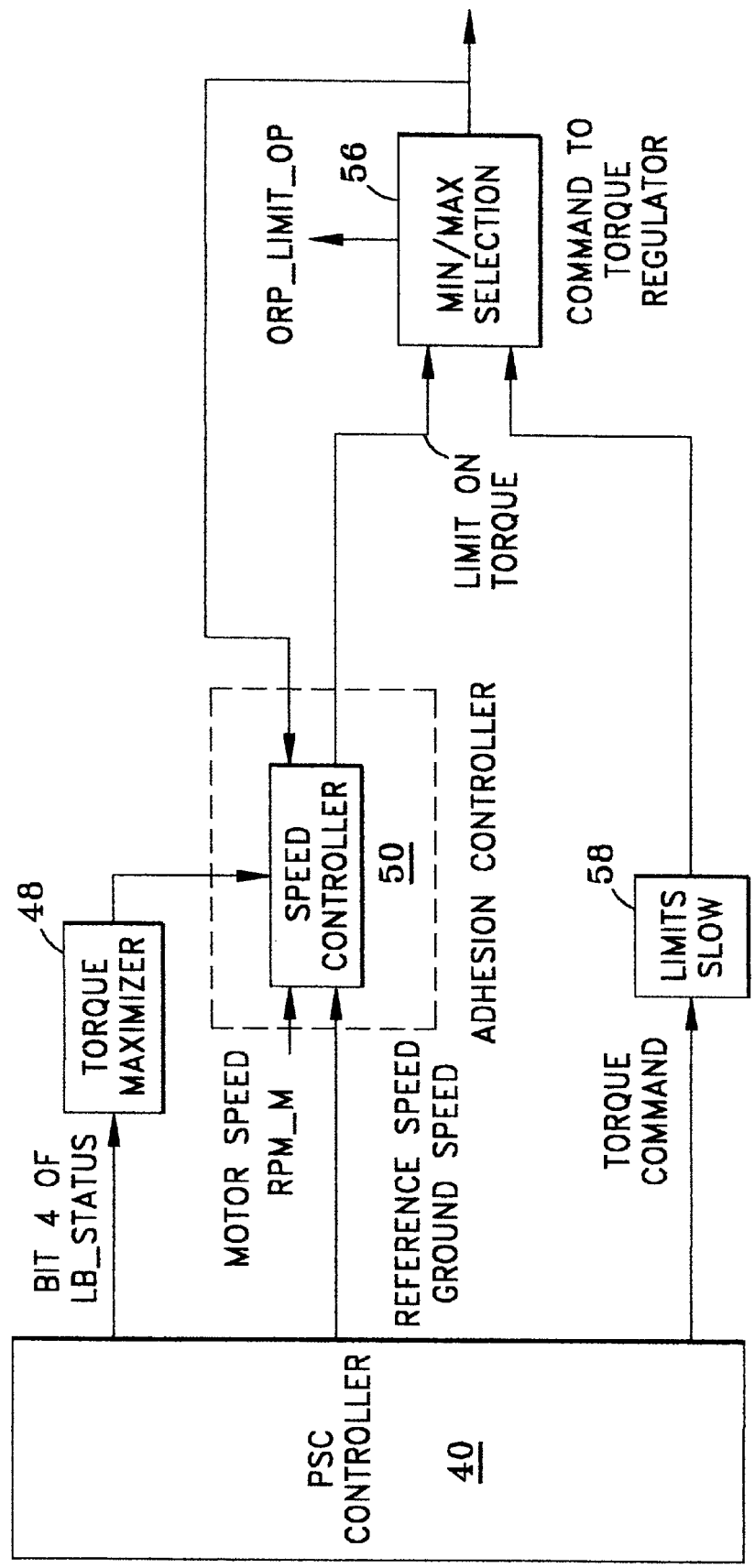
FIG. 5 is a functional block diagram of the inverter controller of FIG. 4.

Turning now to FIG. 5, there is shown a simplified functional block diagram of an adhesion control algorithm implemented in the system of FIG. 4. The PSC controller 40 provides the enable/disable signal to the torque maximizer 48 which provides torque maximizing control to the speed controller block within the adhesion controller 50. PSC 40 also supplies a reference speed equivalent to the ground speed of the vehicle to the speed controller 50. A second signal indicated as RPM is provided to the speed controller and represents the actual feedback speed signal which may be obtained from the tachometer 38. The output of the speed controller is applied as a torque limit signal to a min/max selection circuit 56. A second input to the circuit 56 is the torque command signal from the PSC 40 via a rate of change limit circuit 58. The output of the selection circuit 56 is either the torque command signal or a value of torque command which is limited by the output from the speed controller 50. It will be recognized that when the speed controller limits the output signal from the selection circuit 56, it is essentially limiting the creep speed of the vehicle. More particularly, the speed controller responds to the difference between ground speed and motor speed and since a limit value at the selection circuit 56 which prevents the difference between the reference speed and motor speed from exceeding some predetermined percentage.

In a typical application of the system of FIG. 4 and FIG. 5, each axle of a locomotive is individually controlled and the torque generated at each axle can be separately regulated. Accordingly, the functions indicated in FIG. 5 are duplicated for each wheel or wheel axle set of a locomotive. In the present invention, the functions are implemented in software programming in the inverter controller 46. The software can disable the torque maximizer 48 and then merely vary the creep set point signal to the speed controller to cause the creep speed reference applied to the min/max selection circuit 56 to vary between minimum and maximum limits. Further, since each axle is separately controllable, the system can be implemented such that the torque maximizer is utilized in driving one axle and the variable creep speed set point can be changed with regard to another axle. The amount of torque or tractive effort being generated can be easily calculated based on conventional current and voltage measurements at the motor in a manner well known in the art. Alternatively, tractive effort could be directly measured using a load device coupled to and pulled by the locomotive.

What has been disclosed is a method for implementing an evaluation of a torque maximizer circuit such as the circuit 48 without the need for removing a torque maximizer from a system and replacing it with another system in order to make a comparison. The present system can provide a direct ratio measurement between available tractive effort and optimized tractive effort to determine the functionality of a torque maximizer.

While the invention has been described in what is presently considered to be a preferred embodiment, various modifications and improvements will become apparent to those skilled in the art. It is intended, therefore, that the invention not be limited by the specific disclosed embodiment but be interpreted within the full spirit and scope of the appended claims.

We claim:

1. A method for evaluating the effectiveness of a tractive effort maximizing control system in a wheeled vehicle comprising the steps of:
   operating the vehicle by applying controlled power to at least some wheels of the vehicle to enable motion of the vehicle;
   disabling the tractive effort maximizing control system;
   varying creep speed between a minimum value and a selected maximum value while monitoring tractive effort for identifying a maximum available tractive effort;
   enabling the tractive effort maximizing control system and determining the resulting tractive effort; and
   comparing the resulting tractive effort to the maximum available tractive effort to produce a measure of effectiveness of the tractive effort maximizing control system.

2. The method of claim 1 wherein the steps of disabling and enabling are repetitively cycled to obtain an average measure of effectiveness.

3. The method of claim 2 wherein the average cycle time of the steps of disabling and enabling is about 160 seconds.

4. The method of claim 2 wherein the step of enabling selectively occurs at one of the minimum and maximum values of creep speed.

5. The method of claim 1 and including the step of detecting an impending stall condition during normal operation of the vehicle and performing the steps of disabling and varying creep speed to determine maximum available adhesion characteristics at wheels of the vehicle.

6. A method for evaluating the effectiveness of a tractive effort maximizing control system in a wheeled vehicle having at least two sets of independently controllable powered wheels, the method comprising the steps of:

disabling the tractive effort maximizing control system from one of the sets of powered wheels;

varying creep speed between a maximum and a minimum value in the one of the sets of powered wheels to identify a maximum available tractive effort;

comparing the maximum available tractive effort to the tractive effort produced at other sets of powered wheels of the vehicle using the tractive effort maximizing control system to produce a measure of the effectiveness of the control system.

7. A system for evaluating the effectiveness of a torque maximizer in a traction vehicle of the type including at least one powered wheel driven by an electric motor, control means for controlling power applied to the driven wheel so as to control the creep speed of the wheel, the system including:

a power controller for generating a torque command signal and a reference speed signal, said controller including means for selectively varying the reference speed signal;

an adhesion controller connected for receiving the reference speed signal, a signal representative of wheel speed and a signal representative of an optimized creep speed and for producing a torque limit to attain the optimized creep speed;

a torque maximizer for determining an optimized creep speed set point and for supplying the signal representative thereof to the adhesion controller;

a torque limiter for receiving the torque command signal and the torque limit and providing a torque limited command signal to the control means for controlling power to the driven wheel to achieve the optimized creep speed;

said power controller being programmed to selectively enable said torque maximizer to skew said creep speed set point to vary said creep speed while continuously determining tractive effort whereby maximum available tractive effort is determined, said power controller enabling said torque maximizer in a normal mode and comparing resulting tractive effort to said maximum available tractive effort to determine effectiveness of said torque maximizer.

* * * * *